US008175624B2

(12) United States Patent
Philbin et al.

(10) Patent No.: US 8,175,624 B2
(45) Date of Patent: May 8, 2012

(54) METHOD AND SYSTEM FOR MANAGING A SHORT MESSAGE SERVICE AGGREGATION PLATFORM AND PROVIDING ADVERTISING CONTENT TO MOBILE COMMUNICATION DEVICES

(75) Inventors: John J. Philbin, Chicago, IL (US); Rohan Deuskar, Chicago, IL (US)

(73) Assignee: Phi-Cam, LLC, Chicago, IL (US)

( * ) Notice: Subject to any disclaimer, the term of this patent is extended or adjusted under 35 U.S.C. 154(b) by 310 days.

(21) Appl. No.: 11/531,226

(22) Filed: Sep. 12, 2006

(65) Prior Publication Data

US 2008/0064421 A1    Mar. 13, 2008

(51) Int. Cl.
  *H04W 4/00* (2009.01)
  *H04W 24/00* (2009.01)
  *H04M 3/42* (2006.01)
  *H04M 11/10* (2006.01)
  *H04M 15/00* (2006.01)
  *G06Q 30/00* (2012.01)
  *G06F 15/16* (2006.01)

(52) U.S. Cl. ...... 455/466; 455/414.1; 455/413; 455/456.1; 705/14.1; 705/26.1; 709/246; 709/203; 709/217; 370/328; 379/114.13

(58) Field of Classification Search .......... 455/466
See application file for complete search history.

(56) References Cited

U.S. PATENT DOCUMENTS

| 5,724,521 | A | 3/1998 | Dedrick |
| 6,134,532 | A | 10/2000 | Lazarus et al. |
| 6,205,432 | B1 | 3/2001 | Gabbard et al. |
| 6,308,202 | B1 | 10/2001 | Cohn et al. |
| 6,385,592 | B1 | 5/2002 | Angles et al. |
| 6,470,181 | B1 * | 10/2002 | Maxwell ............ 455/413 |
| 6,804,659 | B1 | 10/2004 | Graham et al. |
| 6,947,531 | B1 | 9/2005 | Lewis et al. |
| 6,973,321 | B2 | 12/2005 | Hjelmvik |
| 6,977,997 | B2 | 12/2005 | Shioda et al. |

(Continued)

FOREIGN PATENT DOCUMENTS

WO  WO 01/44992 A1  6/2001

*Primary Examiner* — Dwayne Bost
*Assistant Examiner* — Timothy Pham
(74) *Attorney, Agent, or Firm* — Bishop & Diehl, Ltd.

(57) ABSTRACT

A management system for managing a short message service (SMS) aggregation platform and providing advertising content to mobile communication device customers is provided. The management system comprises a carrier connection interface, a messaging application program interface (API), user and sponsor databases, and logic. The carrier connection interface is configured to receive a mobile originated (MO) communication from at least one short message service center (SMSC). The API is configured to receive a MO communication from the carrier connection interface. The user database communicates with the messaging API and includes opt-in destination addresses defining an opt-in user list. The sponsor database also communicates with the messaging API. The sponsor database includes at least one sponsor account. At least one opt-in destination address in the opt-in user list and at least one sponsor communication is associated with each of the at least one sponsor accounts. The logic is configured to compare the destination address of the MO communication with the opt-in destination addresses in the opt-in user list. A mobile terminated (MT) communication, comprising at least one sponsor communication, is generated and transmitted when the destination address of the mobile originated communication matches a destination address in the opt-in user list.

13 Claims, 4 Drawing Sheets

U.S. PATENT DOCUMENTS

| | | |
|---|---|---|
| 6,993,326 B2 | 1/2006 | Link, II et al. |
| 7,039,599 B2 | 5/2006 | Merriman et al. |
| 7,047,209 B2 | 5/2006 | Filepp et al. |
| 7,426,533 B2 | 9/2008 | Malone et al. |
| 2002/0176377 A1* | 11/2002 | Hamilton ............... 370/328 |
| 2003/0040300 A1* | 2/2003 | Bodic et al. ............ 455/412 |
| 2004/0059708 A1 | 3/2004 | Dean et al. |
| 2004/0203963 A1* | 10/2004 | Shivaram et al. ........ 455/466 |
| 2007/0072591 A1* | 3/2007 | McGary et al. ......... 455/414.1 |
| 2007/0088851 A1* | 4/2007 | Levkovitz et al. ....... 709/246 |

* cited by examiner

METHOD AND SYSTEM FOR MANAGING A SHORT MESSAGE SERVICE AGGREGATION PLATFORM AND PROVIDING ADVERTISING CONTENT TO MOBILE COMMUNICATION DEVICES

CROSS-REFERENCE TO RELATED APPLICATIONS

Not applicable.

FEDERALLY SPONSORED RESEARCH OR DEVELOPMENT

Not applicable.

TECHNICAL FIELD

The present invention generally relates to a method and system for managing short message service communications, and more particularly, for managing a short message service aggregation platform and providing advertising content to mobile communication devices.

BACKGROUND OF THE INVENTION

Text messaging, and other short message service communications between users of mobile communications devices, has become increasingly popular. As the amount of time subscribers spend communicating using their mobile communication devices increases, a new avenue has been opened for advertisers and sponsors to reach potential customers.

The recent trend in non-mobile based electronic communication such as electronic mail and chat rooms is to provide free or reduced-rate applications and services to subscribers, while recouping the cost of providing such services through advertising and sponsorship. While such models have met with some degree of success in the arena of non-mobile based electronic communications, there exists certain limitations in applying the general model to mobile communications devices. Instead, mobile communications companies have traditionally offer to their subscribers a predetermined number of free minutes per month that may be managed through the use of subscriber free account balances. In such a system, a subscriber may be authorized to use a predetermined number of minutes or a predetermined monetary value of services. Accordingly, the need exists to adapt such a model to a mobile communications platform which accommodates pay for promotion advertising similar to that in non-mobile electronic communications platforms. Furthermore, a need exists for methods and systems by which advertisers can better control, monitor and target the content, scope and recipients of their promotions.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

The present invention is directed to a system and software for managing a short message service (SMS) aggregation platform and providing advertising content to mobile communication device customers. The system comprises a carrier connection interface, a messaging application program interface (API), user and sponsor databases, and logic. The carrier connection interface is configured to receive a mobile originated (MO) communication from at least one short message service center (SMSC). The API is configured to receive a MO communication from the carrier connection interface. The user database communicates with the messaging API and includes opt-in destination addresses defining an opt-in user list. The sponsor database also communicates with the messaging API. The sponsor database includes at least one sponsor account. At least one opt-in destination address in the opt-in user list and at least one sponsor communication is associated with each of the at least one sponsor accounts. The logic is configured to compare the destination address of the MO communication with the opt-in destination addresses in the opt-in user list. A mobile terminated (MT) communication, comprising at least one sponsor communication, is generated and transmitted when the destination address of the mobile originated communication matches a destination address in the opt-in user list.

According to another aspect of the present invention, the management system also includes a records database coupled to the logic. The records database is configured to track messaging statistics associated with a mobile terminated communication, a sponsor communication and billing information corresponding to a sponsor account.

According to still another aspect of the present invention, a sponsor interface is provided. The sponsor interface is configured to receive sponsor account data, the sponsor account data comprising at least a sponsor communication and a destination address in the opt-in user list.

According to yet another aspect of the present invention, a credit is generated based on at least one response to sponsor communication associated with a mobile terminated communication. The credit may be applied to either or both of the sponsor account or destination address account. It will be understood that while a credit to either the destination address account or a charge to the sponsor may be generated based on the MT message recipient's response to the sponsor's message, a credit may also be generated for the sender of the MO message or to the destination address account simply for allowing the sponsor to attach their message to the MO or MT message.

According to still another aspect of the present invention, the messaging application program interface is further configured to extract at least one of a message content, message length and the destination address from the mobile originated communication. The sponsor communication can be selected from one of a plurality of sponsor communications. According to one embodiment, the sponsor communication is selected from one of the plurality of sponsor communications based, at least in part, on the length and/or content of the mobile originated communication.

The present invention also provides a computer readable storage medium adapted to control a computer and including a computer program for managing a short message service aggregation platform and providing advertising content to mobile communication device customers. The computer program comprises a code segment for receiving a mobile originated communication. A code segment is provided for communicating with a user database that includes a plurality of opt-in destination addresses defining an opt-in user list. A code segment is provided for communicating with a sponsor database. The sponsor database includes at least one sponsor account, at least one opt-in destination address in the opt-in user list and at least one sponsor communication associated with each of the at least one sponsor accounts.

The computer program also includes a code segment for comparing the destination address of the mobile originated communication with the opt-in destination addresses in the opt-in user list. A code segment is also provided for appending a sponsor communication to the mobile originated communication to generate a mobile terminated communication is generated and transmitted. This code segment generates the mobile terminated communication when the destination address of the mobile originated communication matches a destination address in the opt-in user list. The computer program also has a code segment for transmitting the mobile terminated communication. The mobile terminated communication includes both the mobile originated communication and the sponsor communication.

According to another aspect of the present invention, the system includes a first server (e.g., computer) configured to receive a text message from a first mobile communication device. The text message includes a destination address associated with a second mobile communication device. The first server includes logic for transmitting the text message to a second server.

The second server includes logic for communicating with a user database and a sponsor database. As discussed herein user database has a plurality of opt-in destination addresses defining an opt-in user list. The sponsor database includes at least one sponsor account, at least one opt-in destination address in the opt-in user list and at least one sponsor communication associated with each of the at least one sponsor account. The second server also includes logic for comparing the destination address of a text message with the opt-in destination addresses in the opt-in user list. The second server includes logic for generating a MT communication by appending a sponsor communication to the text message when the destination address of the text message matches a destination address in the opt-in user list. Logic is also provided for transmitting the mobile terminated communication to either the first server or directly to a mobile communication device associated with the destination address.

The present invention is also directed to a method for providing advertising content to mobile communication device customers. According to one embodiment of the present invention, the method comprises the step of receiving a text message communication. A user database and a sponsor database are searched. The user database includes a plurality of opt-in destination addresses defining an opt-in user list. The sponsor database includes at least one sponsor account, at least one opt-in destination address in the opt-in user list and at least one sponsor communication associated with each of the at least one sponsor accounts. The destination address of the a text message is compared with the opt-in destination addresses in the opt-in user list. If the destination address of the a text message matches a destination address in the opt-in user list, a mobile terminated communication is generated by appending a sponsor communication to the a text message. The mobile terminated communication, comprising the mobile originated communication and the sponsor communication, is then transmitted.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
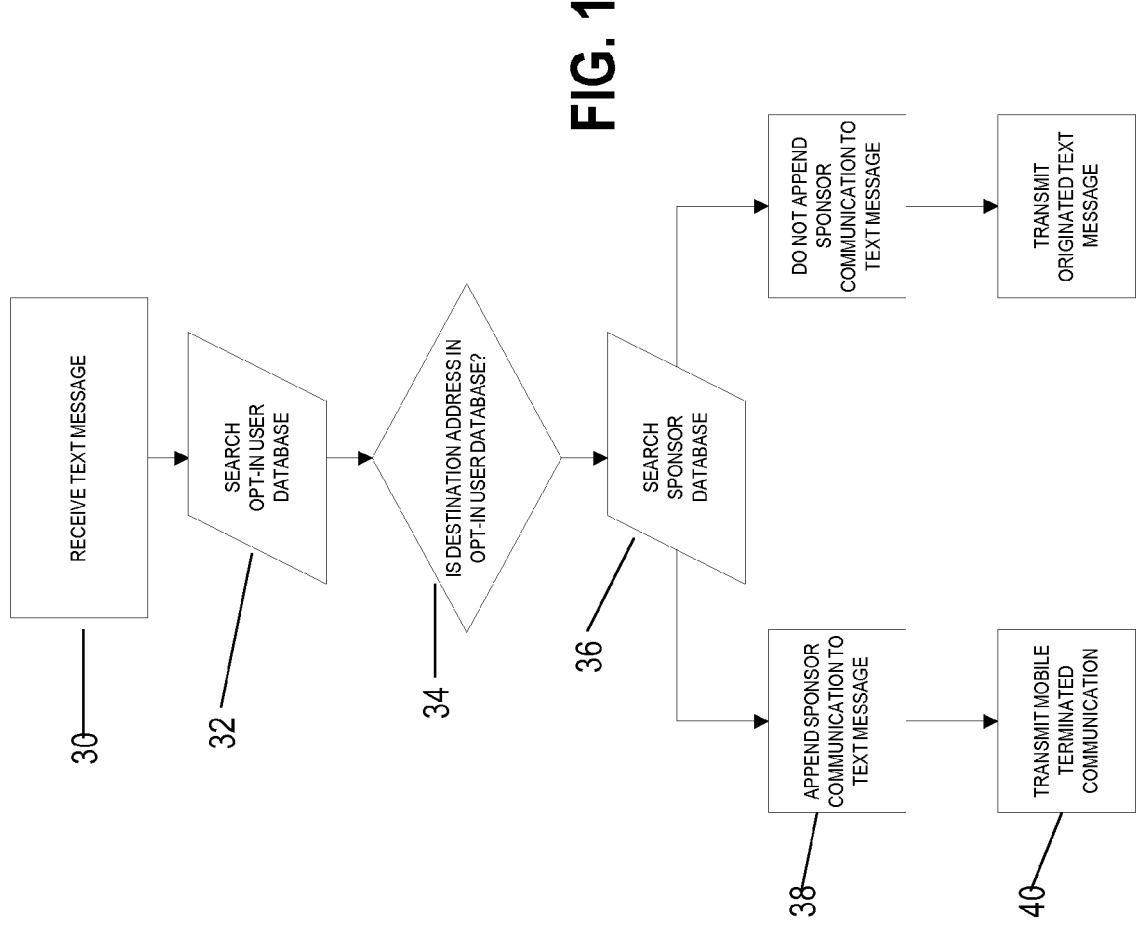
FIG. 1 is a flow chart illustrating a method for managing a short message service aggregation platform and providing advertising content to mobile communication devices in accordance with the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

As shown in FIG. 1, the present invention provides a method for providing advertising content to mobile communication device customers. According to one embodiment of the present invention, the method comprises the step of receiving a text message communication 30. A user database and a sponsor database are searched (32, 34). The user database includes a plurality of opt-in destination addresses defining an opt-in user list. The sponsor database includes at least one sponsor account, at least one opt-in destination address in the opt-in user list and at least one sponsor communication associated with each of the at least one sponsor accounts. The destination address of the a text message is compared with the opt-in destination addresses in the opt-in user list 36. If the destination address of the a text message matches a destination address in the opt-in user list, a mobile terminated communication is generated by appending a sponsor communication to the a text message 38. The mobile terminated communication, comprising the mobile originated communication and the sponsor communication, is then transmitted 40. Conversely, the original text message is transmitted if the destination address of the a text message does not match a destination address in the opt-in user list.

Figure 2:
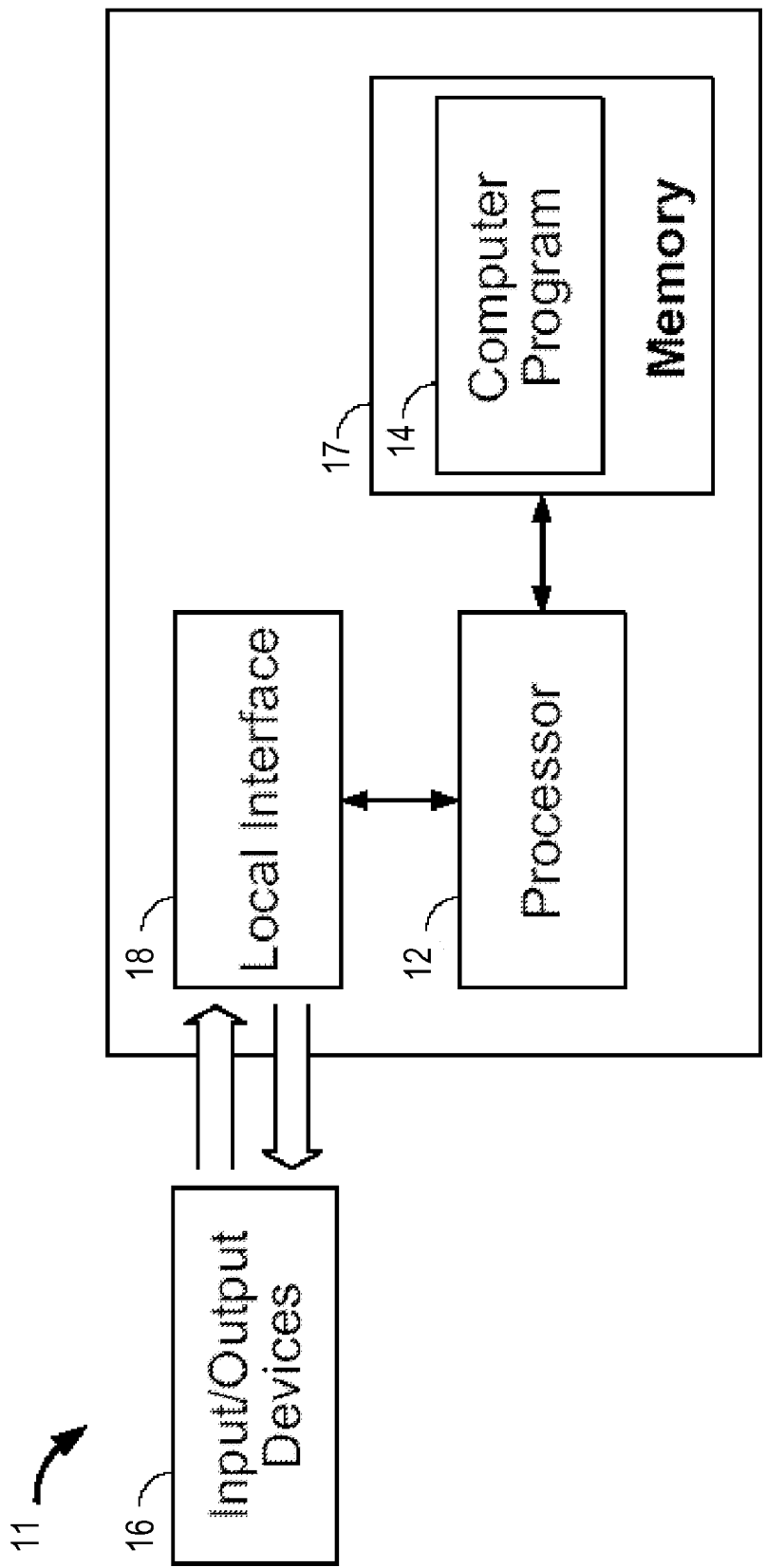
FIG. 2 is a block diagram of a computer used in connection with the present invention.
Figure 3:
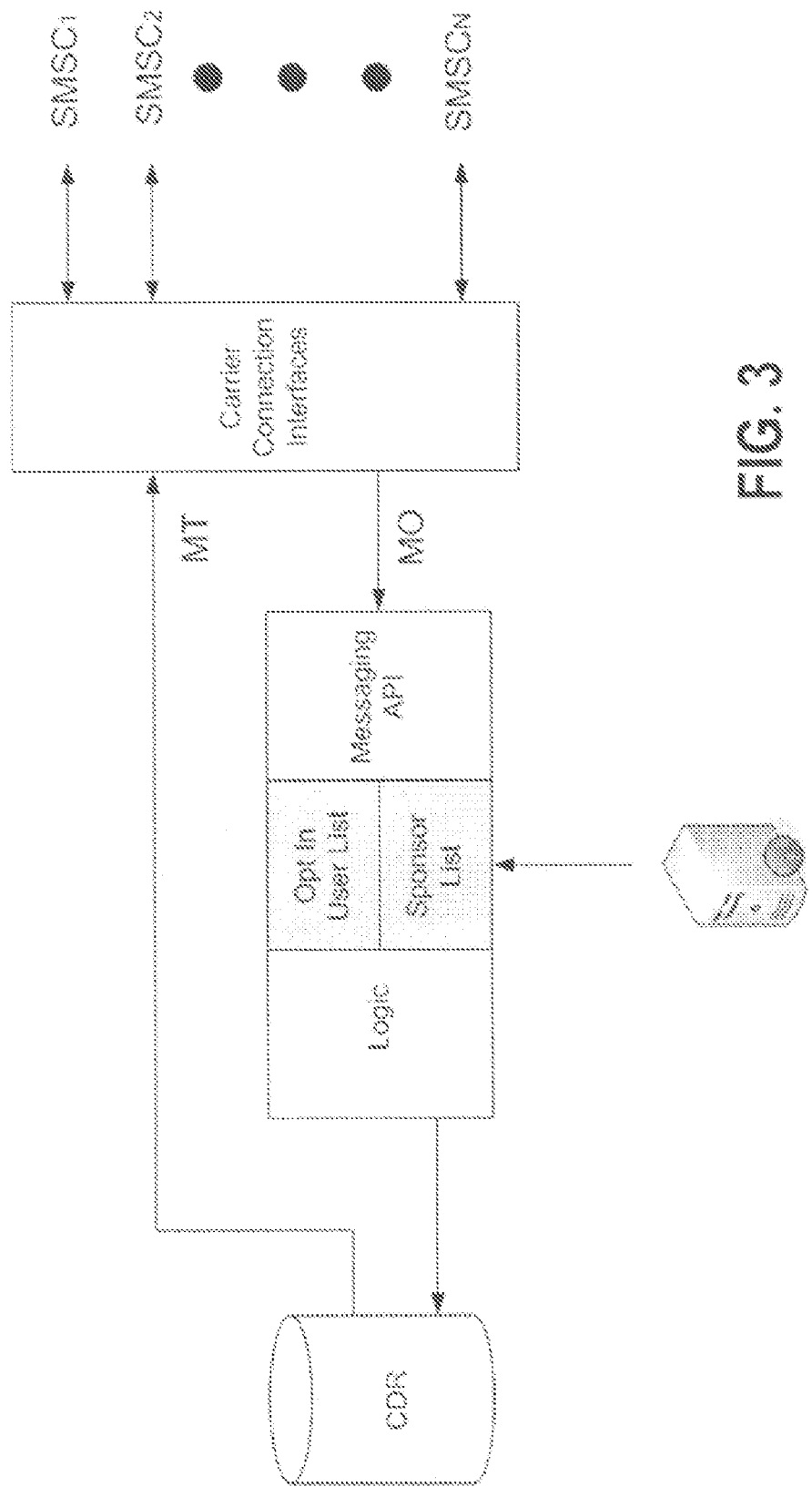
FIG. 3 is a schematic diagram of the architecture of a system for managing a short message service aggregation platform configured in accordance with the principles of the present invention; and, FIG. 4 is a schematic diagram of a method and system for managing a short message service aggregation platform in accordance with the present invention.
Figure 4:
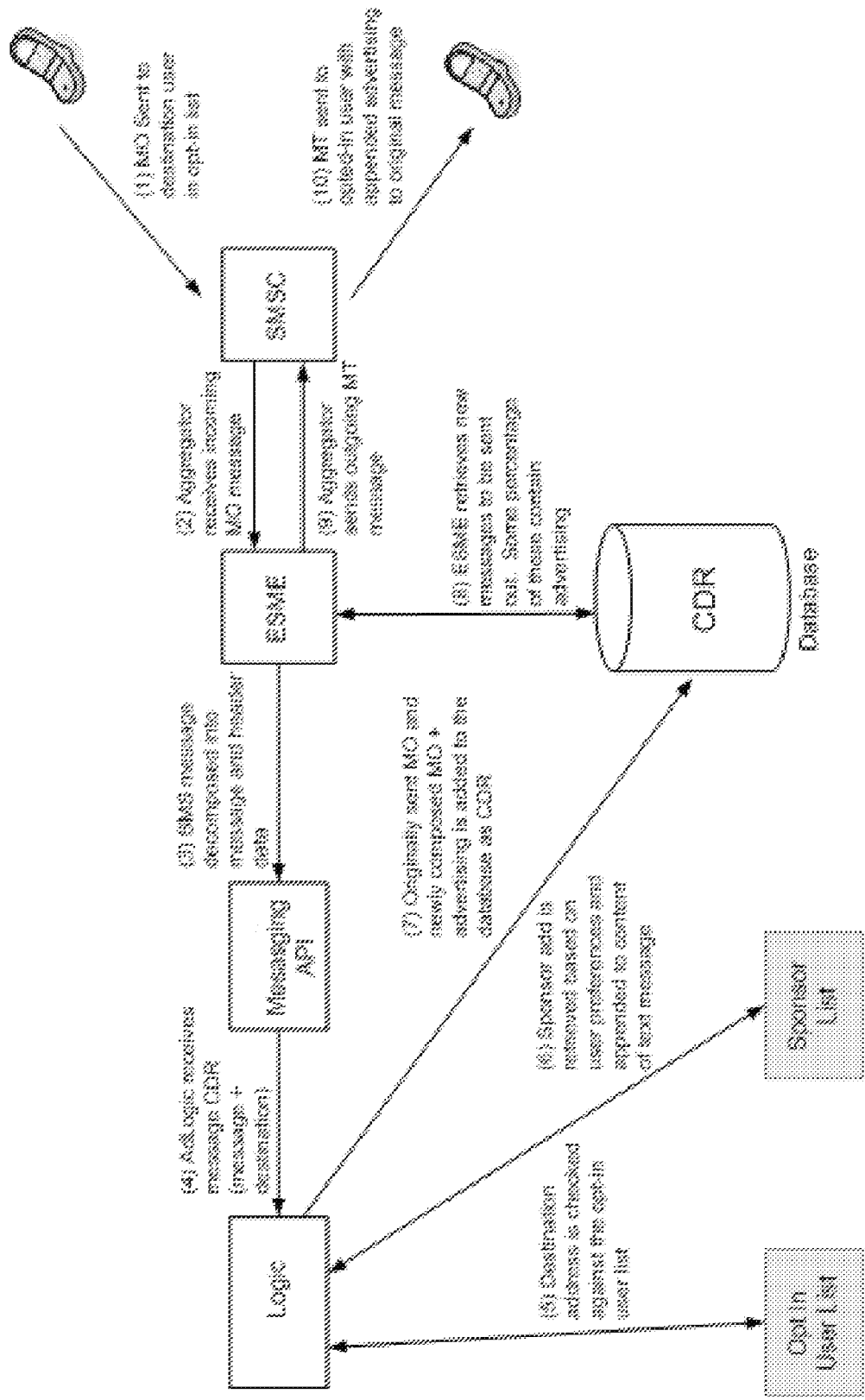

With references to FIGS. 2-4, process descriptions or blocks in figures should be understood as representing modules, segments, or portions of code which include one or more executable instructions for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

FIG. 2 is a block diagram of a server (e.g., computer) 11. For purposes of understanding the hardware as described herein, the terms "computer" and "server" have identical meanings and are interchangeably used. Computer 11 includes management system 17. The management system 17 of the invention can be implemented in software (e.g., firmware), hardware, or a combination thereof. In the currently contemplated best mode, the management system 17 is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. An example of a general purpose computer that can implement the management system 17 of the present invention is shown in FIG. 2. The management system 17 may reside in, or have portions residing in, any computer such as, but not limited to, a general purpose personal computer. Therefore, computer 11 of FIG. 2 may be representative of any computer in which the management system 17 resides or partially resides.

Generally, in terms of hardware architecture, as shown in FIG. 2, the computer 11 includes a processor 12, memory 14, and one or more input and/or output (I/O) devices 16 (or peripherals) that are communicatively coupled via a local interface 18. The local interface 18 can be, for example, but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 12 is a hardware device for executing software, particularly software stored in memory 14. The processor 12 can be any custom made or commercially available processor, a central processing unit (CPU), an auxiliary processor among several processors associated with the computer 11, a semiconductor based microprocessor (in the form of a microchip or chip set), a macroprocessor, or generally any device for executing software instructions. Examples of suitable commercially available microprocessors are a PA-RISC series microprocessor from Hewlett-Packard Company, an 80×8 or Pentium series microprocessor from Intel Corporation and other similar such processors.

The memory 14 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 14 may incorporate electronic, magnetic, optical, and/or other types of storage media. The memory 14 can have a distributed architecture where various components are situated remote from one another, but can be accessed by the processor 12.

The software in memory 14 may include one or more separate programs, each of which comprises an ordered listing of executable instructions for implementing logical functions. In the example of FIG. 2, the software in the memory 14 includes the management system 17 in accordance with the present invention and a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system essentially controls the execution of other computer programs, such as the management system 17, and provides scheduling, input-output control, file and data management, memory management, and communication control and related services.

The management system 17 may be a source program, executable program (object code), script, or any other entity comprising a set of instructions to be performed. When a source program, the program needs to be translated via a compiler, assembler, interpreter, or the like, which may or may not be included within the memory 14, so as to operate properly in connection with the O/S. Furthermore, the management system 17 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In one embodiment, the management system 17 is written in C++. The I/O devices 16 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 16 may also include output devices, for example but not limited to, a printer, bar code printers, displays, etc. Finally, the I/O devices 16 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 11 is a PC, workstation, PDA, or the like, the software in the memory 14 may further include a basic input output system (BIOS) (not shown in FIG. 2). The BIOS is a set of software routines that initialize and test hardware at startup, start the O/S, and support the transfer of data among the hardware devices. The BIOS is stored in ROM so that the BIOS can be executed when the computer 11 is activated.

When the computer 11 is in operation, the processor 12 is configured to execute software stored within the memory 14, to communicate data to and from the memory 14, and to generally control operations of the computer 11 pursuant to the software. The management system 17 and the O/S, in whole or in part, but typically the latter, are read by the processor 12, perhaps buffered within the processor 12, and then executed.

When the management system 17 is implemented in software, as is shown in FIG. 2, it should be noted that the management system 17 can be stored on any computer readable medium for use by or in connection with any computer related system or method. In the context of this document, a computer-readable medium can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital video disc (DVD), a universal serial bus (USB) drive, or other similar such memory devices. The management system 17 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In another embodiment, where the management system 17 is implemented in hardware, the management system 17 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Nonetheless, it will be understood to one of ordinary skill in the art that "logic" as used herein may be embodied in a computer readable storage medium adapted to control a computer as described herein. Alternatively, logic may be hardwired circuitry in a computer which enables the performance of logic functions or operations as described herein. It should also be understood that reference to a code segment or logic can mean the same code segment or logic used to perform another operation or function as a prior or subsequently described code segment or logic.

Referring now to FIGS. 3 AND 4, one embodiment of the architecture of the present invention is provided. More particularly, a system 17 for managing a short message service (SMS) aggregation platform and providing advertising content to mobile communication device customers is provided. For purposes of the present invention, it will also be understood that the short message service communications are transmitted from portable communication devices.

The portable communication devices uses in connection with the present system 17 are, in one preferred embodiment, a cellular telephone. However, it will be understood that any portable communication device capable of responding to the first communication in text format is capable of interaction with the system 17 in accordance with the principles of the present invention. For example, the portable communication device may be a personal digital assistant such as that available through cellular service carriers, or two-way text messaging devices. Furthermore, although the preferred communication device is portable, mobile, and configured for interaction and communication with a cellular communication network, it will be understood that other suitable non-mobile devices may be used in connection with the present invention.

It will be further understood that the short message service communications of the present invention are not limited to text-messages. It is contemplated that the portable communication device used in connection with the present invention also be a communication device configured to transmit media, as well as communications in text format. For example, multimedia messaging service (MMS) protocol may be used to allow the transmissions from the portable communication device to include text, and in addition, formatting information regarding the text, additional meta-information regarding the communication, and additional data such as images, sounds and other media.

Generally, the system 17 includes one or more carrier interfaces 110 to each of a plurality of the short message service centers (SMSC), a messaging application program interface (API) 112, user and sponsor databases 116, and logic embedded in a computer. According to the present invention, the carrier connection interface is configured to receive a mobile originated (MO) communication from at least one short message service center (SMSC). As shown in FIG. 3, the carrier connection interface may be configured to receive MO communications from any number of SMSCs. It will be understood that the short message service communications are received by, for example a server (e.g. computer), over a communication network either directly or in combination with the internet or other network utilized by the radio station transmitting the first communication. Such networks are known and well established.

The messaging API 112 is configured to receive a MO communication from the carrier connection interface. The messaging API 112 can further configured to extract the message content, message length and the destination address from the MO communication. The user database 114 communicates with the messaging API 112 and includes opt-in destination addresses defining an opt-in user list. The opt-in user list generally consists of mobile subscribers that have signed up with a messaging service through a wireless carrier or similar service. At or after the time of subscription, the mobile subscriber will be offered the opportunity to opt-in to one or more opt-in user lists that are associated with various SMS messaging programs for accepting advertisements appended to each text message that they receive. It will be understood that information other than the opt-in choice can be included in the opt-in user list without departing from the present invention.

The sponsor database 116 also communicates with the messaging API 112. The sponsor database 116 includes at least one sponsor account, at least one opt-in destination address in the opt-in user list and at least one sponsor communication is associated with each of the at least one sponsor accounts. Generally, the sponsor database 116 will consists of sponsors that desire to advertise via text messages or other SMS communication. The sponsor may create sponsor communications of varying in length, content, or type. It is contemplated that the sponsor communication can be one or a combination of a text message, a video stream, an image file, uniform resource locators (URLs) leading to wireless application protocol (WAP) sites, an audio stream or any other transmittable data packet. For example, the sponsor communications can be text messaging call-to-action using keywords, simple brand verbiage, pictures, MMS advertisements, sponsor jingles, etc.

According to one embodiment of the present invention, the system 17 includes a sponsor interface 118. The sponsor interface 118 is configured to receive sponsor account data. Sponsor account data can include various information relating to the sponsor and the sponsor's advertising program, including at least one sponsor communication and a list of destination addresses to be included in the opt-in user list.

In use, the system 17 can be configured such that the frequency at which a sponsor communication from a sponsor is sent is be tied to the proportion of advertising money spent by a sponsor. Alternatively, the frequency at which a sponsor communication is sent may correlate to the payment status of a sponsor. The system 17 may also be configured to credit a sponsor account if a predetermined volume of sponsor communications are transmitted to destination addresses in the opt-in user list. Accordingly, the sponsor account data can also include information relating to sponsor billings and credits.

As discussed above, the system 17 further includes logic configured to compare the destination address of the MO communication with the opt-in destination addresses in the opt-in user list. A mobile terminated (MT) communication, comprising at least one sponsor communication, is generated when the destination address of the mobile originated communication matches a destination address in the opt-in user list. The sponsor communication can be selected from one of a plurality of sponsor communications of varying length, content or type. According to one embodiment of the present invention, the sponsor communication is selected based on at least the length of the mobile originated communication.

After the MT communication is generated, the MT communication can be transmitted to a records database 122, directly to a destination address or back to the SMSC for routing to a destination address. It is also contemplated that the MT communication can be transmitted to any combination of these destinations. According to one embodiment of the invention, the user composing the MO communication may not be aware that advertising is being appended to the messages that they compose. Instead, the advertisement is added only to the outgoing MT communication. Alternatively, the system 17 may compare the sender's address with the opt-in user database 114. According to such a configuration, the sender will also receive a copy of the sponsor communication in the form of a mobile transmission if the sender's address is in the opt-in user list.

According to one embodiment of the invention, shown in FIG. 3, the system 17 includes a records database 122 which communicates with the logic. According to such an embodiment, if the MO message is destined for a user in the opt-in list, sponsor communication is appended to the MO communication and the MT message is added into the records database 122. The system 17 retrieves the newly composed MT messages from the database, and transmits the MT message over one of the carrier connections to the appropriate SMSC.

The records database 122 is configured to store call detail records. These records can be used by a sponsor or other user to track messaging statistics associated with a mobile terminated communication, the nature of a sponsor communication, billing information corresponding to a sponsor account and other information relevant to the receipt and transmission of the MO and MT messages. It is contemplated that sponsor interface 118 be communicably coupled to the records database 122 so that the sponsor can track messaging statistics, billing information, payment status and other information associated with a particular sponsor account.

According to one embodiment of the present invention, a credit can be generated and applied to an opt-in destination address account. In such an embodiment, the credit is generated based on at least one response to sponsor communication associated with a mobile transmitted communication. It is contemplated that, according to such an embodiment, the both the sponsor account and the destination address account be credited. The credit can take the form of a cash discount on the same or ancillary services. Alternatively, the credit can take the form of a non-cash award, such as a points award program or a sweepstakes credit. It will be understood that in one embodiment of the invention, the recipient of the MT does not need to take any action to respond to the sponsor message for a credit to be applied. While taking a new action in response to the sponsor message may have some additional impact (e.g., charges to the sponsor or credit to the recipient), the primary credit to the recipient will be awarded for allowing the MT message to be tagged with the sponsor branding.

One embodiment of the present invention provides that the logic used in connection with the present invention is a computer readable storage medium adapted to control a computer and including a computer program for managing a short message service aggregation platform and providing advertising content to mobile communication device customers. The computer program comprises a code segment for receiving a mobile originated communication. A code segment is provided for communicating with a user database 114 that includes a plurality of opt-in destination addresses defining an opt-in user list. A code segment is provided for communicating with a sponsor database 116. The sponsor database 116 includes at least one sponsor account, at least one opt-in destination address in the opt-in user list and at least one sponsor communication associated with each of the at least one sponsor accounts.

The computer program also includes a code segment for comparing the destination address of the mobile originated communication with the opt-in destination addresses in the opt-in user list. A code segment is also provided for appending a sponsor communication to the mobile originated communication to generate a mobile transmitted communication is generated and transmitted. This code segment generates the mobile terminated communication when the destination address of the mobile originated communication matches a destination address in the opt-in user list. The computer program also has a code segment for transmitting the mobile terminated communication. The mobile terminated communication includes both the mobile originated communication and the sponsor communication.

According to one embodiment, a code segment for receiving a sponsor account data from a sponsor interface 118 and a code segment for storing the received sponsor account data is provided. The computer program can also include a code segment for associating a payment status with a sponsor account. A code segment can also determine whether to append a sponsor communication to the MO message based upon the payment status associated with the sponsor account.

A code segment for transmitting the mobile terminated communication is configured to transmit the mobile terminated communication and associated messaging statistics to a records database 122 is provided. As discussed herein, the records database 122 is configured to track messaging statistics associated with the mobile terminated communication. A code segment is also provided for updating a records database 122 configured to track messaging statistics associated with a mobile terminated communication.

One embodiment of the present invention provides a code segment for determining the message length of the mobile originated communication. A code segment is provided for selecting the sponsor communication from one of the plurality of sponsor communications based on at least the length of the mobile originated communication.

According to one embodiment of the invention, the system 17 includes a first server (e.g. computer) configured to receive a text message from a first mobile communication device. The text message includes a destination address associated with a second mobile communication device. The first server includes logic for transmitting the text message to a second server.

According to this embodiment the second server includes logic for communicating with a user database 114 and a sponsor database 116. As discussed herein user database 114 has a plurality of opt-in destination addresses defining an opt-in user list. The sponsor database 116 includes at least one sponsor account, at least one opt-in destination address in the opt-in user list and at least one sponsor communication associated with each of the at least one sponsor account. The second server also includes logic for comparing the destination address of a text message with the opt-in destination addresses in the opt-in user list. The second server includes logic for generating a MT communication by appending a sponsor communication to the text message when the destination address of the text message matches a destination address in the opt-in user list. Logic is also provided for transmitting the mobile terminated communication to either the first server or directly to a mobile communication device associated with the destination address. Again, it is contemplated that the "logic" of the second server can be embodied in a computer readable storage medium adapted to control a computer or hard-wired circuitry in a computer which enables the performance of logic functions or operations as described herein.

While the specific embodiments have been illustrated and described, numerous modifications come to mind without significantly departing from the spirit of the invention, and the scope of protection is only limited by the scope of the accompanying Claims.

What is claimed is:

1. A management system for managing a short message service aggregation platform and providing advertising content to mobile communication device customers, the system comprising:
   a short message service center carrier connection interface configured to receive a mobile originated communication comprising a text message from at least one short message service center;
   a messaging application program interface configured to receive a mobile originated communication from the carrier connection interface;
   a user database coupled to the messaging application program interface, the user database comprising a plurality of opt-in destination addresses defining an opt-in user list;
   a sponsor database coupled to the messaging application program interface, the sponsor database comprising at least one sponsor account, at least one opt-in destination address in the opt-in user list and at least one sponsor communication being associated with each of the at least one sponsor accounts; and,
   logic coupled to the user database and the sponsor database, the logic further being configured to compare the destination address of the mobile originated communication with the opt-in destination addresses in the opt-in user list, a mobile terminated communication is generated and transmitted when the destination address of the mobile originated communication matches a destination address in the opt-in user list, the mobile terminated communication comprising at least one sponsor communication comprising an advertisement attached thereto for eliciting a response from a recipient of the mobile terminated communication, said advertisement being selected based, at least in part, on the content and length of the mobile originated communication.

2. The management system of claim 1, further comprising a records database communicably coupled to the logic, the records database being configured to track messaging statistics associated with a mobile terminated communication, a sponsor communication and billing information corresponding to a sponsor account.

3. The management system of claim 1, further comprising a sponsor interface, the sponsor interface being configured to receive sponsor account data, the sponsor account data comprising at least a sponsor communication and a destination address in the opt-in user list.

4. The management system of claim 1, wherein a credit is generated and applied to with a sponsor account, the credit being generated based on at least one response to sponsor communication associated with a mobile transmitted communication.

5. The management system of claim 1, wherein a credit is generated and applied to at least one of a sender address account and an opt-in destination address account, the credit being generated based on at least one response to sponsor communication associated with a mobile terminated communication.

6. The management system of claim 1, wherein the messaging application program interface is further configured to extract at least one of a message content, message length and the destination address from the mobile originated communication.

7. The management system of claim 1, wherein the sponsor communication is selected from one of a plurality of sponsor communications.

8. The management system of claim 7, wherein the sponsor communication is selected from one of the plurality of sponsor communications based on at least the length of the mobile originated communication.

9. The management system of claim 7, wherein the sponsor communication is one of a text message, a video stream, an image file and an audio stream.

10. The management system of claim 1, wherein the logic is embodied in a computer readable storage medium adapted to control a computer.

11. A management system for managing a short message service aggregation platform and providing advertising content to mobile communication device customers, the system comprising:
    a first server configured to receive a text message from a first mobile communication device, the text message including a destination address associated with a second mobile communication device, the first server comprising logic for transmitting the text message to a second server, the second server including logic for communicating with a user database and a sponsor database, the user database comprising a plurality of opt-in destination addresses defining an opt-in user list, the sponsor database comprising at least one sponsor account, at least one opt-in destination address in the opt-in user list and at least one sponsor communication being associated with each of the at least one sponsor accounts;
    logic for comparing the destination address of a text message with the opt-in destination addresses in the opt-in user list;
    logic for generating a mobile terminated communication by appending a sponsor communication to the text message when the destination address of the text message matches a destination address in the opt-in user list, said sponsor communication comprising an advertisement for eliciting a response from a recipient of the mobile terminated communication, said advertisement being selected based, at least in part, on the content and length of the mobile originated communication; and,
    logic for transmitting the mobile terminated communication to one of either the first server and a mobile communication device associated with the destination address.

12. The management system of claim 11, wherein the logic in the second server is embodied in a computer readable storage medium adapted to control a computer.

13. A method for providing advertising content to mobile communication device customers, the method comprising:
    receiving a text message communication;
    providing for searching a user database and a sponsor database, the user database comprising a plurality of opt-in destination addresses defining an opt-in user list the sponsor database comprising at least one sponsor account, at least one opt-in destination address in the opt-in user list and at least one sponsor communication being associated with each of the at least one sponsor accounts;

providing for comparing the destination address of the a text message with the opt-in destination addresses in the opt-in user list;

providing for generating a mobile terminated communication by appending a sponsor communication to the text message when the destination address of the a text message matches a destination address in the opt-in user list, said sponsor communication comprising an advertisement for eliciting a response from a recipient of the mobile terminated communication, said advertisement being selected based, at least in part, on the content and length of the mobile originated communication; and, transmitting the mobile terminated communication, the mobile terminated communication comprising the mobile originated communication and the sponsor communication.

* * * * *